L. F. SLEADE.
ROCK DRILL.
APPLICATION FILED JUNE 26, 1908.
945,624.
Patented Jan. 4, 1910.
2 SHEETS—SHEET 2.
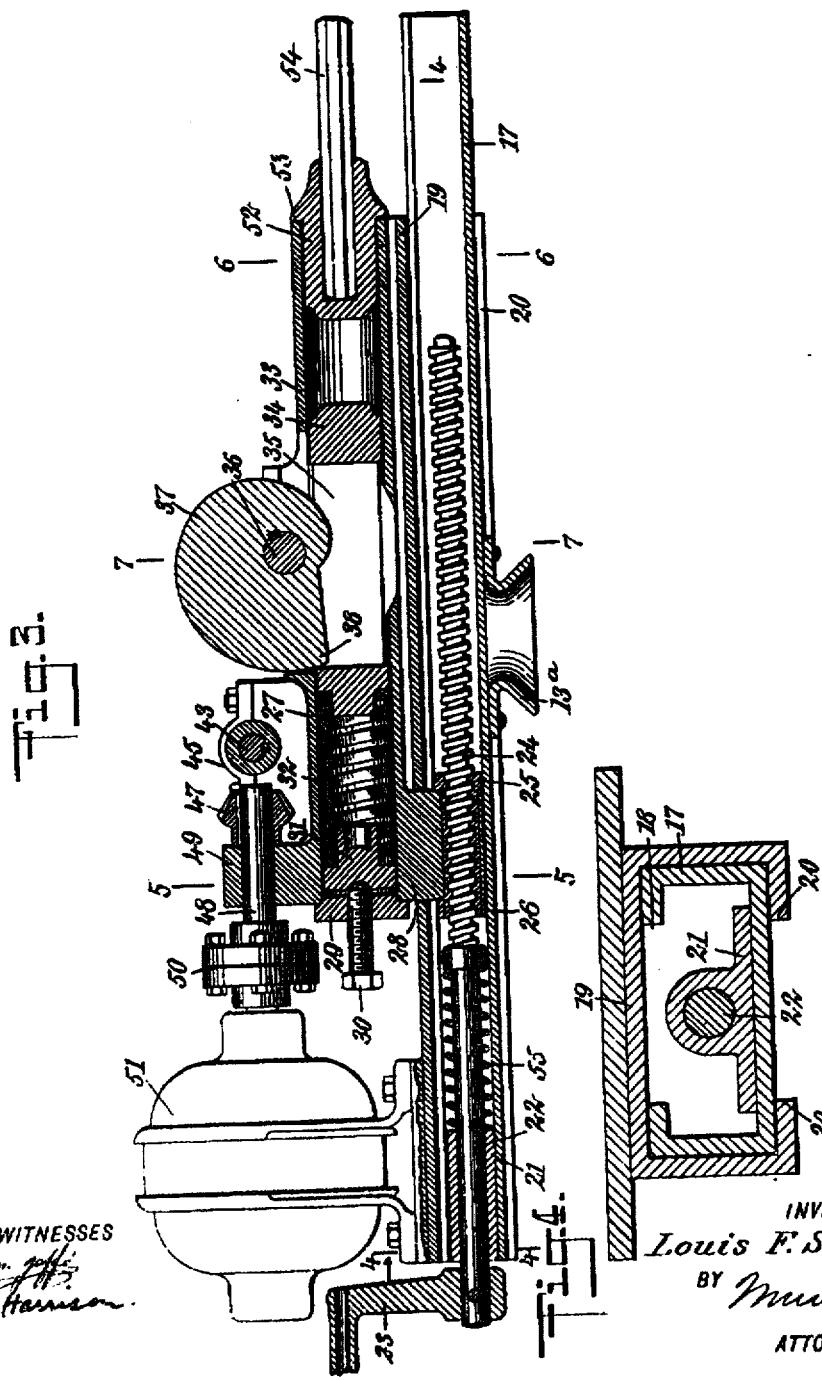
WITNESSES
INVENTOR
Louis F. Sleade
BY
ATTORNEYS

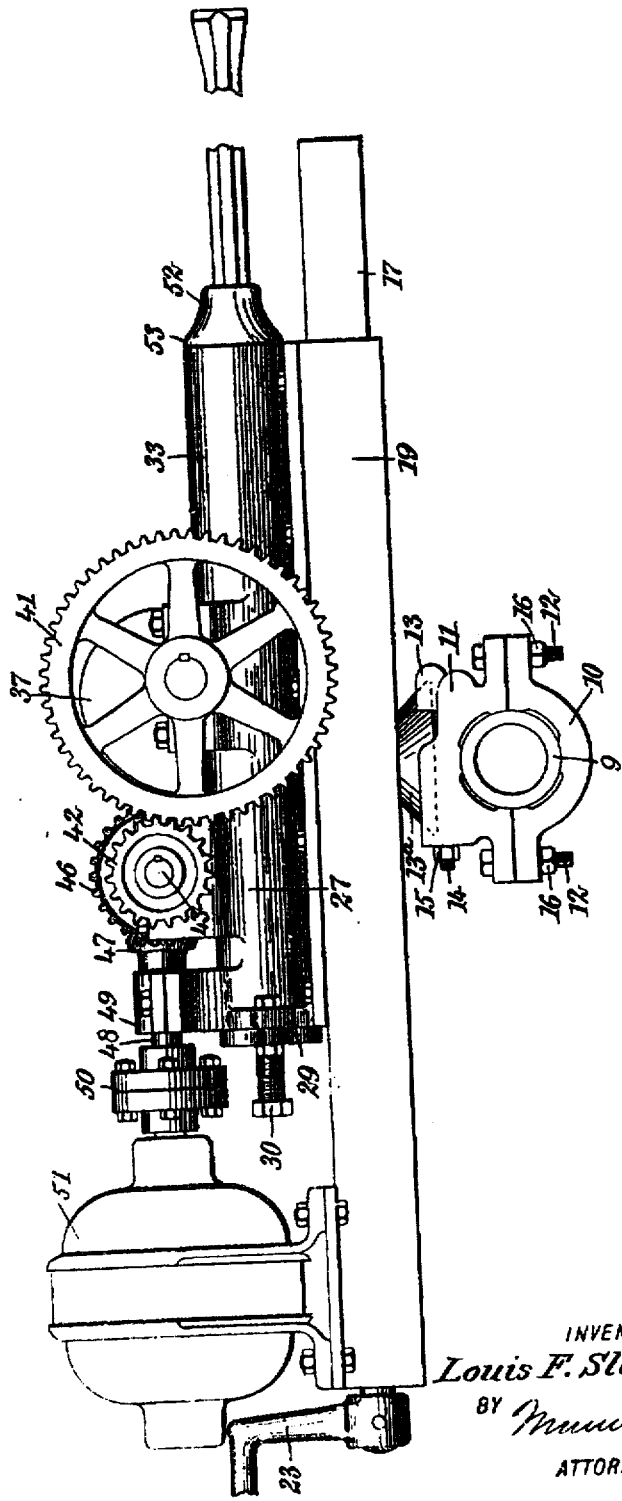

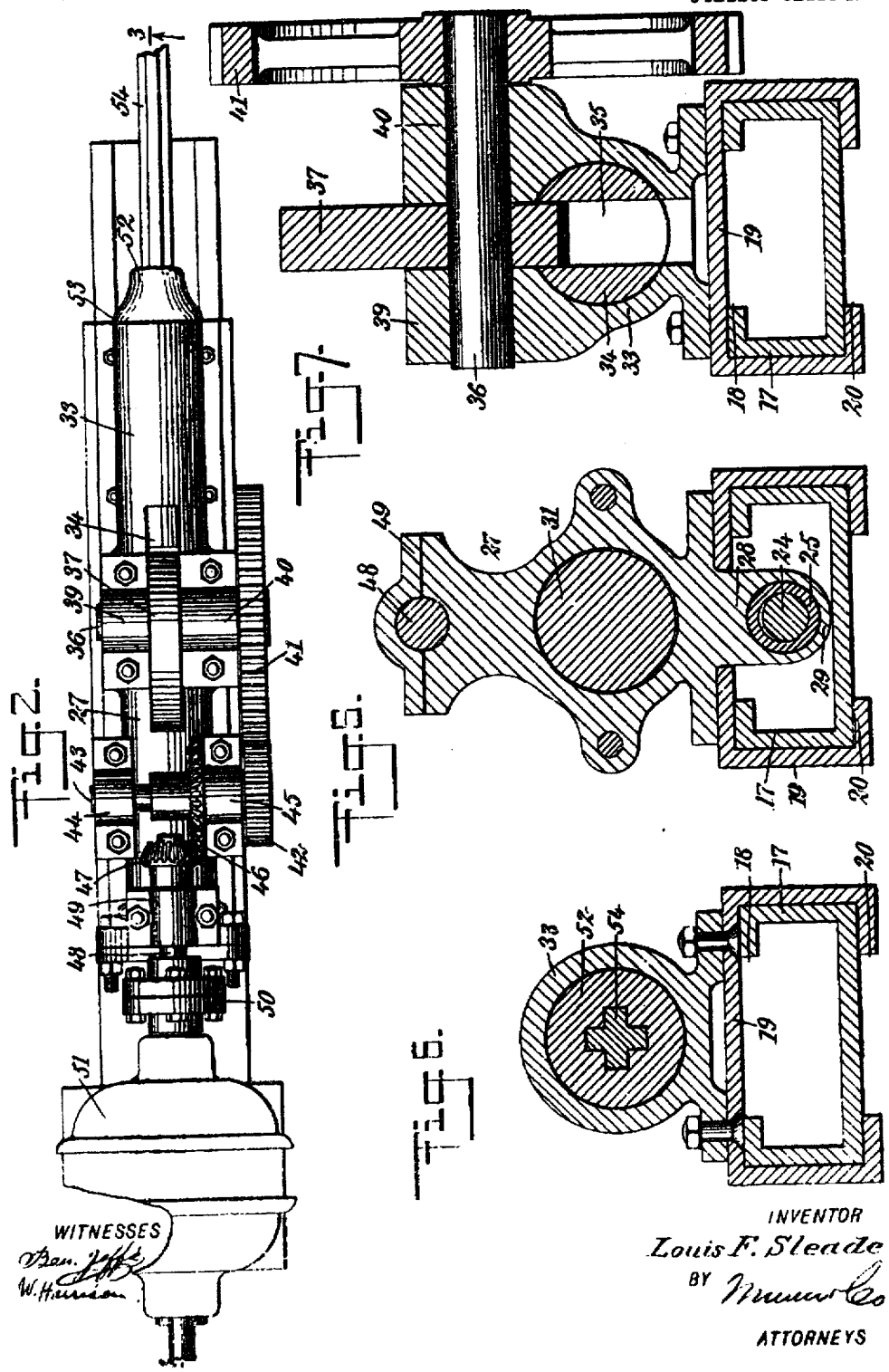

UNITED STATES PATENT OFFICE.

LOUIS FRANKLIN SLEADE, OF DENVER, COLORADO, ASSIGNOR OF ONE-HALF TO WILLIS A. SHERWOOD, OF SILVERTON, COLORADO.

ROCK-DRILL.

945,624.  Specification of Letters Patent.  Patented Jan. 4, 1910.

Application filed June 26, 1908. Serial No. 440,472.

*To all whom it may concern:*

Be it known that I, LOUIS FRANKLIN SLEADE, a citizen of the United States, and a resident of Denver, in the county of Denver and State of Colorado, have invented a new and Improved Rock-Drill, of which the following is a full, clear, and exact description.

My invention relates to drills, my more particular purpose being to provide a type of drill especially suitable for work in rock and similar hard substances, and possessing a number of constructional advantages whereby its utility is greatly increased.

Reference is to be had to the accompanying drawings forming a part of this specification, in which similar characters of reference indicate corresponding parts in all the figures.

Figure 1 is a side elevation of the drill complete, this view showing the drill bit and the gearing and motor for actuating the same, all of these parts being mounted together and movable as a unit as the drill advances, the movement being under control of the operator; Fig. 2 is a plan view of the mechanism shown in Fig. 1; Fig. 3 is a substantially central vertical section on the line 3—3 of Fig. 2, looking in the direction of the arrow, this section being taken through the principal portions of the drill and showing the hammer and mechanism used in immediate connection with the hammer, for actuating the same; this view further showing how all of these parts, as a unit, are adjustable by aid of a hand-operated screw and may be advanced at will as the drill bit is driven forward; Fig. 4 is an enlarged vertical section upon the line 4—4 of Fig. 3, looking in the direction of the arrow, and showing a part of the mountings for the hand-operated adjusting screw used for advancing the drill, various other parts being omitted from this view, however, for the sake of clearness; Fig. 5 is a section on the line 5—5 of Fig. 3. Fig. 6 is an enlarged section upon the line 6—6 of Fig. 3, and Fig. 7 is a section upon the line 7—7 of the same figure.

Mounted upon a tubular shaft 9 are bearing boxes 10, 11 held together by bolts 12 and adjustable by aid of these bolts. Mounted upon the box 11 is a shoe 13 provided with a threaded stem 14, this stem being fitted with a nut 15. A saddle 13ª of frusto-conical form engages the shoe 13 and is held in position by aid of the nut 15. This saddle is revoluble about the axis of the cone frustum whenever the nut 15 is loosened. The bearing boxes 10, 11 are similarly revoluble about the tubular shaft 9 whenever the bolts 12 are loosened. These bolts are provided with nuts 16 whereby they may be loosened and tightened.

Riveted securely upon the saddle 13ª is a shell 17 made of angle metal and having a cross section of the shape which may be understood from Fig. 4. This shell 17 is provided at its top with a slot 18. A slide 19, likewise made of angle iron, partially circumscribes the shell 17 and is provided at its bottom with a slot 20, this slot being of proper width for the saddle 13ª to extend through it. The parts being thus arranged, the slide 19 is movable relatively to the shell 17 and the latter is therefore essentially a slideway.

A bearing sleeve 21 is secured rigidly within the shell 17. Extending through this bearing sleeve is a shaft 22, and mounted upon the outer end of this shaft is a hand crank 23. Mounted upon the shaft 22 and revoluble therewith is a screw 24 which extends a considerable distance into the shell 17. Fitted upon this screw and movable in the general direction of the length of the shell 17 is a nut 25, this nut being provided with a nut lock 26 for holding it in position.

A cylinder 27 is mounted upon a neck 28, and extending directly from this neck is a collar 26 which encircles the nut 25. The neck 28 extends through the upper portion of the slide 19. The cylinder 27 is provided with a head 29 and extending through this head is an adjusting screw 30. The inner end of this screw engages a stop plate 31. A spiral spring 32 is mounted within the cylinder 27, and one end of this spring rests directly against the stop plate.

A barrel 33 is in alinement with the cylinder 27. A hammer 34 is slidably mounted within this barrel and is provided with a slot 35. The hammer 34 is engaged directly by the spring 32. Mounted above the hammer 34 is a shaft 36, and secured rigidly upon this shaft is a cam 37, provided with a point 38, this cam partially extending into the slot 35, as will be understood from Fig. 3. The shaft 36 turns in bearings 39, 40.

Mounted upon the shaft 36 is a gear wheel 41, and meshing with this gear wheel is a pinion 42, the latter being mounted upon a shaft 43. This shaft is mounted in bearings 44, 45, as will be understood from Fig. 2. Mounted upon the shaft 43 is a bevel gear 46, and meshing with the latter is a bevel pinion 47. The bevel pinion is mounted upon a shaft 48, which turns in a bearing 49. This shaft is provided with a coupling 50 and is turned by aid of an induction motor 51.

Mounted loosely within the front end of the barrel 33 is a drill-holder 52, provided with an annular shoulder 53. A drill-bit 54 is fitted into the drill-holder.

A spiral spring 55 (see left of Fig. 3) encircles the shaft 22 and is used for the purpose of cushioning the screw 24 and parts operated by this screw, as hereinafter described.

The operation of my device is as follows: The general adjustment of the drill relatively to the work, is made by loosening the nuts 15, 16 (see bottom of Fig. 1). If it be desired to give the drill unusual freedom of direction, the bolts 15, 16 are left loose. Power from the motor 51 is applied through the shaft 48, bevel pinion 47, bevel gear 46, shaft 43, pinion 42, gear 41 and shaft 36 to the cam 37. This cam turns in a clockwise direction according to Fig. 3. At each complete revolution of the cam the point 38 forces back the hammer 34, thus compressing the spiral spring 32. The instant the hammer is released by virtue of the point 38 clearing the slot 35, however, the force of the spring 32 drives the hammer 34 forward, causing it to strike the drill-holder 52 and actuate the drill-bit 54. The operator can increase or diminish the tension of the spiral spring 32 by adjusting the bolt 30, as will be understood from Fig. 3. The force of the blow delivered to the drill-bit is proportionate to the strength of the spring 32, and is delivered directly by the action of this spring. The cam serves merely to retract the hammer and to release it periodically. By turning the crank 23 so as to rotate the screw 24, and thus force the nut 25 forward or backward, the operator causes the slide 19 to move forward or backward, as desired. When the drill bit 54 is being pushed forward, as, for instance, when a rock is being drilled continuously, the operator forces the slide 19 forward continuously or step by step after each stroke of the drill, as he sees proper. The spiral spring 55, by yielding slightly under excessive strains, allows not only the screw 24 and nut 25, but also the slide 19 and all working parts carried by it, to recede. When, therefore, the work of the drill is exceptionally hard, or when the forward progress of the drill is hindered because of the resistance of the material operated upon, the worst that can happen is that the spring 55 is compressed, the slide and various parts carried thereby simply moving backward and the stroke of the drill being therefore idle.

Having thus described my invention, I claim as new and desire to secure by Letters Patent:

In a device of the class described, a slideway, a slide movable thereon, said slide having a lug, a feed screw threaded through the lug for moving the slide, a collar on the screw, a spring encircling the screw and bearing at one end against the collar, a fixed abutment against which the other end of the spring bears and in which the screw is journaled, and manually operated means for rotating the screw.

In testimony whereof I have signed my name to this specification in the presence of two subscribing witnesses.

LOUIS FRANKLIN SLEADE.

Witnesses:
 GEO. W. ROSE,
 WILLIAM A. McDOWELL.